United States Patent
Takao et al.

[11] 3,728,730
[45] Apr. 17, 1973

[54] APPARATUS FOR DETECTING INCIDENT ANGLE OF RADIO WAVE

[75] Inventors: Kazuaki Takao, Kyoto; Masakazu Takeuchi, Amagasaki, both of Japan

[73] Assignee: Mitsubishi Denki Kabushiki Kaisha, Tokyo, Japan

[22] Filed: Sept. 16, 1970

[21] Appl. No.: 72,564

[30] Foreign Application Priority Data

Sept. 22, 1969 Japan ........................ 44/75434

[52] U.S. Cl. ........................ 343/113 R, 343/16 M
[51] Int. Cl. ........................................ G01s 3/46
[58] Field of Search ................... 343/113 R, 16 M

[56] References Cited

UNITED STATES PATENTS 3,164,831  1/1965  Mraz ........................ 343/113 R UX
3,540,054  11/1970  Broderick ........................ 343/113 R
3,141,164  7/1964  Holcomb et al. ............... 343/113 R X

*Primary Examiner*—Benjamin A. Borchelt
*Assistant Examiner*—Richard E. Berger
*Attorney*—Robert E. Burns and Emmanuel J. Lobato

[57] ABSTRACT

An apparatus for detecting an incident angle of radio wave can find the incident angle of radio signal without mechanical motion of any of antennas or radiator elements. The radio signals received by the paired radiator elements are utilized to produce a sum and a difference signals, with the phase relationship between them changing with a magnitude of the incident angle. By using a combination of polarities of the sum and the difference signals, the incident angle can be detected in digital form.

8 Claims, 6 Drawing Figures

APPARATUS FOR DETECTING INCIDENT ANGLE OF RADIO WAVE

BACKGROUND OF THE INVENTION

1. Field of the Invention

This invention relates to an apparatus for detecting an incident angle of wave energy which is applicable, for instance, to a tracking radar finding an incident angle of wave energy beamed from or reflected by a source such as a space vehicle or an aircraft to thereby determine the direction of the source, and to a communication antenna system finding an incident angle of communication wave.

2. Description of the Prior Art

To perform the above function, the following two types of radio wave incident angle detection apparatus have been heretofore provided.

The first type of apparatus to be described here is a hitherto-employed one, with which the radio wave incident angle detection can be effected by utilizing a mechanical rotation of an antenna; i.e., in this apparatus, radio signals received by the associated radiator elements are utilized to produce a sum signal and a difference signal which are, in turn, utilized to produce an analog signal having a magnitude proportional to the difference between magnitudes of these two signals and having either a negative or positive polarity depending on the phase relation between them. By this analog signal, the antenna is made to mechanically rotate until the same faces directly the direction of the incoming wave energy. The angular position of the antenna resulting after the mechanical rotation is detected by an electrical signal from a synchro-resolver rotating with the antenna and from the result of this detection the incident angle of the radio wave is determined.

However, the apparatus of the above type is complicated in construction and has difficulty in rapidly detecting the incident angle of radio wave owing to its utilization of mechanical rotation of the antenna.

The second type of apparatus is a hitherto-employed one having a pair of antenna elements (antenna array), with one of the pair being equipped with a radio wave phase shifter (microwave phase shifter). Radio wave received by the antenna elements is similarly utilized to produce a sum signal and a difference signal which are, in turn, utilized to produce an analog signal of the same features as previously described with regard to the apparatus of the first type. In accordance with this analog signal, the phase shifter shifts the phase angle of radio signal by such a magnitude that the antenna becomes of the highest in sensitivity to the incoming radio wave. The shifted amount of the phase angle by the phase shifter represents the incident angle of the radio wave incident upon the antenna array.

When using the apparatus of the second type, there is no need to rotate the antenna like that of the first type. However, it is known that the phase shifter involves some difficulties. That is, to obtain a desired amount of phase-shifting selectively, the phase shifter must be of such complex construction that it comprises either a type having a plurality of phase shifter units different in phase-shifting characteristic, or a rotary type with a ferrite rotator, so it is impossible to quickly accomplish a detection of the incident angle owing to the complexity of the phase shifter. Furthermore, as such a microwave phase shifter is generally composed of ferrite, it has the characteristic of greatly changing in its phase-shifting amount through fluctuations in ambient temperature, which fact stands in the way of its accurate incident angle detection.

An object of the invention is therefore to provide a new and improved apparatus for detecting an incident angle of radio wave, simple in construction and capable of quickly detecting the incident angle of the radio wave with high accuracy, and without using the mechanical rotation of any of its antenna elements or the above-mentioned radio phase shifter.

SUMMARY OF THE INVENTION

In accordance with the invention, an apparatus for detecting an incident angle of radio wave is provided with a detection unit, to which is supplied a sum and a difference signals obtained from incoming radio signals incident upon a pair of antenna elements while providing a quantized phase data on one of its output terminals in accordance with a combination of polarities of the sum and difference signals. As the polarities of the sum and difference signals periodically change depending upon a magnitude of the incident angle of the radio wave, the incident angle can be detected digitally by converting the combination of the polarities of the sum and the difference signals to the quantized phase data of a digital form. The use of such detection unit eliminates the need of the mechanical motion of any of the antenna elements and the radio phase shifter, thereby making it possible to quickly detect the incident angle with high accuracy.

BRIEF DESCRIPTION OF THE DRAWINGS

The invention will become more readily apparent from the following description made in conjunction with the accompanying drawings in which.

DESCRIPTION OF THE PREFERRED EMBODIMENTS

Figure 1:
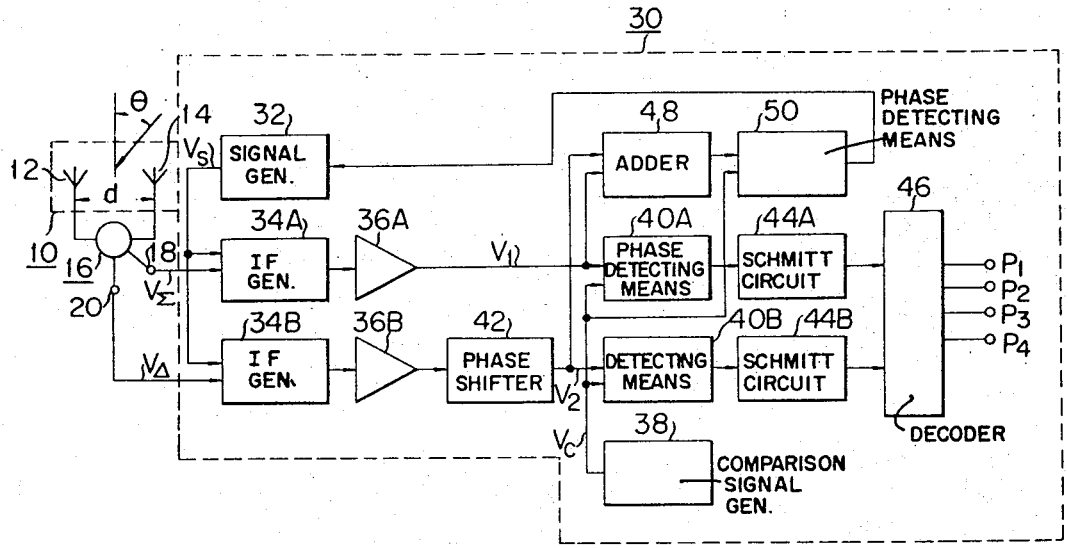
FIG. 1 is a schematic block diagram of an apparatus for detecting an incident angle of radio wave constructed in accordance with the principle of the invention.

Referring now to the drawings and particularly to FIG. 1, there is shown an apparatus for detecting an incident angle $\theta$ of wave energy such as an echo emanating from a source (not shown); e.g., a space vehicle, which apparatus comprises an antenna array 10 with antenna or radiator elements 12 and 14 spaced a distance $d$ apart. The radiator elements 12 and 14 are connected together at their lower portions, as shown in FIG. 1, by a hybrid circuit 16 which has a first and a second output terminals 18 and 20. The incoming signal derived from the source is received at both the radiator elements 12 and 14 and supplied therefrom to the hybrid circuit 16 as the input signals, where these two input signals are utilized to produce a sum signal $V\Sigma$ and a difference signal $V\Delta$, said first output terminal 18 of the hybrid circuit 16 yielding the just described sum signal $V\Sigma$ and second output terminal 20 yielding the difference signal $V\Delta$.

The above-mentioned hybrid circuit 16 may be formed, for instance, by a coupler of microstrip type or a coupler so-called the magic T.

Figure 2:
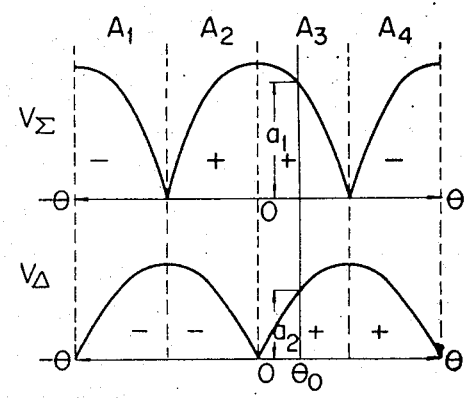
FIG. 2 is a graph of waveforms of the sum and the difference signals including the phase characteristics from the hybrid circuit indicated in FIG. 1.

Referring to FIG. 2, there is shown the two waveforms for illustrating the amplitude and phase relations between the sum and the difference signals $V\Sigma$ and $V\Delta$ with respect to variations of the incident angle $\theta$ of the wave energy incident upon the antenna array 10. The term "incidnet angle" means an angle that the line joining the antenna array and the source emanating the wave energy forms with a fixed reference line of direction perpendicular to a plane including the radiator elements 12 and 14. The relations between the incident angle $\theta$ and the signals $V\Sigma$ and $V\Delta$ can be expressed by the following equations, respectively:

$$V\Sigma \; \alpha \cos(\phi/2)$$

$$V\Delta \; \alpha \sin(\phi/2)$$

wherein $\phi = kd \sin\theta$, $k = 2\pi/\lambda$ and $\lambda$ is the propagation wavelength.

In FIG. 2, four ranges $A_1$, $A_2$, $A_3$ and $A_4$ of the incident angle are seen to exist. In the range $A_1$, the phases are: $V\Sigma$ and $V\Delta$ both negative; in the range $A_2$, $V\Sigma$ positive, $V\Delta$ negative; in the range $A_3$, $V\Sigma$ and $V\Delta$ both positive; and in the range $A_4$, $V\Sigma$ negative, and $V\Delta$ positive. It is noted that the negative phase and the positive phase of each of the signals $V\Sigma$ and $V\Delta$ are in opposite phase relation.

FIG. 2 further shows the amplitudes of the signals $V\Sigma$ and $V\Delta$ in addition to the phases thereof. The amplitudes are displayed on the ordinate as the function of the incident angle $\theta$. For instance, in the case of $\theta = \theta_0$, the signal $V\Sigma$ has the amplitude of $a_1$ and the signal $V\Delta$ has the amplitude of $a_2$.

It is to be noted that a 90° phase difference exists between the signals $V\Sigma$ and $V\Delta$, i.e., the signals $V\Sigma$ and $V\Delta$ are 90° out of phase. Such a phase difference occurs where the phases of the signals $V\Sigma$ and $V\Delta$ are considered to be a function of time as known to the art. Although FIG. 2 shows the phase relations between the signals $V\Sigma$ and $V\Delta$ in terms of the plus and minus signs (−, +), such phase relations occur when they are expressed as the function of the incident angle $\theta$. Also FIG. 2 shows the changes in phase of each of the signals $V\Sigma$ and $V\Delta$. It is stated again that the signals $V\Sigma$ and $V\Delta$ from the associated output terminals 18 and 20 of the hybrid circuit 16 are 90° out of phase when they are considered as the function of time. This means that the phase of the signal $V\Delta$ is delayed by 90° with respect to that of the signal $V\Sigma$. Therefore, it will be understood, for instance, in the range $A_1$, that although both the signals $V\Sigma$ and $V\Delta$ have their negative phases the signal $V\Delta$ is delayed in phase by 90° with respect to the signal $V\Sigma$, and this 90° phase difference, of course, constantly exists in any one of the ranges $A_1$, $A_2$, $A_3$ and $A_4$.

Reverting back to FIG. 1, there is shown a radio angle detection unit generally designated by its reference numeral 30, which includes a reference signal generator 32 for generating a reference signal $V_s$ for the purpose to be hereinafter described. The signal generator 32 may be a voltage controlled oscillator, to generate the alternating current reference signal $V_s$ having a frequency larger or smaller by an intermediate frequency than that of the radio signal incident upon the antenna array 10. The detection unit 30 further includes intermediate frequency (IF) generators 34A and 34B which are generally called mixers. The first IF generator 34A is fed the input signals, i.e., the sum signal $V\Sigma$ from the output terminal 18 of the hybrid circuit 16 and the reference signal $V_s$ from the signal generator 32, and generates an IF output having the frequency identical with the difference between the frequencies of the input signals $V\Sigma$ and $V_s$. And, the second IF generator 34B is fed the input signals, i.e., the difference signal $V\Delta$ from the second output terminal 20 of the hybrid circuit 16 and the reference signal $V_s$ from the signal generator 32, and similarly generates an IF output having the frequency identical with the difference between the frequencies of the input signals $V\Delta$ and $V_s$. The IF outputs from the IF generators 34A and 34B, whose phases correspond respectively to the phases of the sum and the difference signals $V\Sigma$ and $V\Delta$, are then supplied to associated intermediate frequency (IF) amplifiers 36A and 36B where they are suitably amplified. An output of the IF amplifier 36A is called a first signal $V_1$.

The detection unit 30 further includes a comparison signal generator 38 and phase-detecting means 40A and 40B. The first phase detecting means 40A receives the first signal $V_1$ and a comparison signal $V_c$ from the comparison signal generator 38 as the inputs, thus utilizing the comparison signal $V_c$ for the detection of the signal $V_1$. The phase-detecting means 40A effects the detection of the first signal $V_1$ in such a manner that, for instance, if this first signal $V_1$ and the comparison signal $V_c$ are in phase then the phase-detecting means 40A generates a direct-current output of positive polarity, but if they are in opposite phase, then the phase-detecting means 40A generates a direct-current output of negative polarity.

An output signal of the IF amplifier 36B is supplied to a 90° phase shifter 42 where it is shifted in phase angle by 90°. This shifted output from the phase shifter 42 is called a second signal $V_2$. The second phase-detecting means 40B receives the second signal $V_2$ and the comparison signal $V_c$ from the comparison signal generator 38 as the inputs, thus utilizing the comparison signal $V_c$ for the detection of the second signal $V_2$. The detecting means 40B effects the detection of the second signal $V_2$ in such a manner that, for instance, if the second signal $V_2$ and the comparison signal $V_c$ are in phase, then the phase-detecting means 40B generates a direct-current output of positive polarity, but if they are in opposite phase, then the phase detecting means 40B generates a direct-current output of negative polarity.

Again it is stated that the difference signal $V\Delta$ is constantly delayed in phase angle by 90° with respect to the sum signal $V\Sigma$. Therefore, it will be readily understood that such 90° phase difference between the signals $V\Sigma$ and $V\Delta$ can be compensated by the 90° phase shifter 42, and accordingly, between the first and the second signals $V_1$ and $V_2$, there is no time delay corresponding to the phase angle of 90°. As the result of the phase shifting operation of the phase shifter 42, the first and second signals $V_1$ and $V_2$ come into phase in the case of incident angle $\theta$ being in the range $A_1$ or $A_3$ and 180° out of phase in the case of the incident angle $\theta$ being in the range $A_2$ or $A_4$.

Further more, the comparison signal $V_c$ from the comparison signal generator 38 may have, for instance, the same phase as the positive phase of the sum signal $V\Sigma$. Under such a condition, in the range $A_1$ of the incident angle, both the phase-detecting means 40A and 40B generate the direct-current output of negative polarities; in the range $A_2$, the phase-detecting means 40A generates the direct-current output of positive polarity and the phase-detecting means 40B generates that of negative polarity; in the range $A_3$, both the phase-detecting means 40A and 40B generate the direct-current outputs of positive polarities; and in the case of the range $A_4$, the phase detecting means 40A generates the direct-current output of negative polarity and the phase-detecting means 40B generates that of positive polarity.

The radio incident angle detection unit 30 further comprises Schmidt circuits 44A and 44B and a detector 46. The Schmidt circuits 44A and 44B receive respectively the direct-current outputs from the phase-detecting means 40A and 40B and convert them into pulses, the resulting pulses corresponding in polarity to the received direct-current outputs. The detector 46 is formed as a two-input four-output decoder which receives the output pulses from the Schmidt circuits 44A and 44B and produces, after decoding them, an output or quantized phase data at any one of its output terminals generally designated by the reference numerals $P_1$, $P_2$, $P_3$ and $P_4$ in FIG. 1. For instance, when the incident angle $\theta$ is in the range $A_1$, theeoutput of the decoder 46 appears at the terminal $P_1$, and when this angle $\theta$ is in the range $A_2$, $A_3$ or $A_4$, the output of the decoder 46appears accordingly at the terminal $P_2$, $P_3$ or $P_4$. Thus, the output of the decoder 46 appears at one of the output terminals $P_1$-$P_4$ depending on a magnitude of the incident angle $\theta$ of the wave energy incident upon the antenna array 10. This enables the incident angle $\theta$ to be detected digitally.

Furthermore, the radio incident angle detection unit 30 comprises an adder 48 and a third phase detecting means 50, with the adder adding the signals $V_1$ and $V_2$. The adder 48, which may be a conventional adding resistor network, includes a polarity switch (a 180° phase shifter) which allows the signals $V_1$ and $V_2$ to be added together after 180° phase shift of the output or signal $V_2$ from the 90° phase shifter 42 in case the signals $V_1$ and $V_2$ are out of phase. Thus, signals $V_1$ and $V_2$, when added together, are in phase. The phase detector 50 acts to detect the output signal from the adder 48 relative to the comparison signal $V_c$. As will be apparent, if the radio signal incident upon the antenna array 10 changes in frequency, then the output from the adder 48 becomes out of phase with the comparison signal $V_c$ by an angle depending on the change of the frequency. That is to say, some amount of phase difference is introduced between the output from adder 48 and the comparison signal $V_c$. The phase detector 50 generates a direct-current output, whose polarity depends on whether the phase of the output from the adder 48 is advanced or lagged as compared with the comparison signal $V_c$, and whose magnitude is proportional to the amount of phase difference introduced between the output from the adder 48 and the comparison signal $V_c$. This direct-current output is fed back to the reference signal generator 32 to change the frequency of the reference signal $V_s$ generated so that the output from the adder 48 becomes in phase with the comparison signal $V_c$. Thus, it will be understood that the phase detector 50 forms a phase lock loop.

Figure 3:
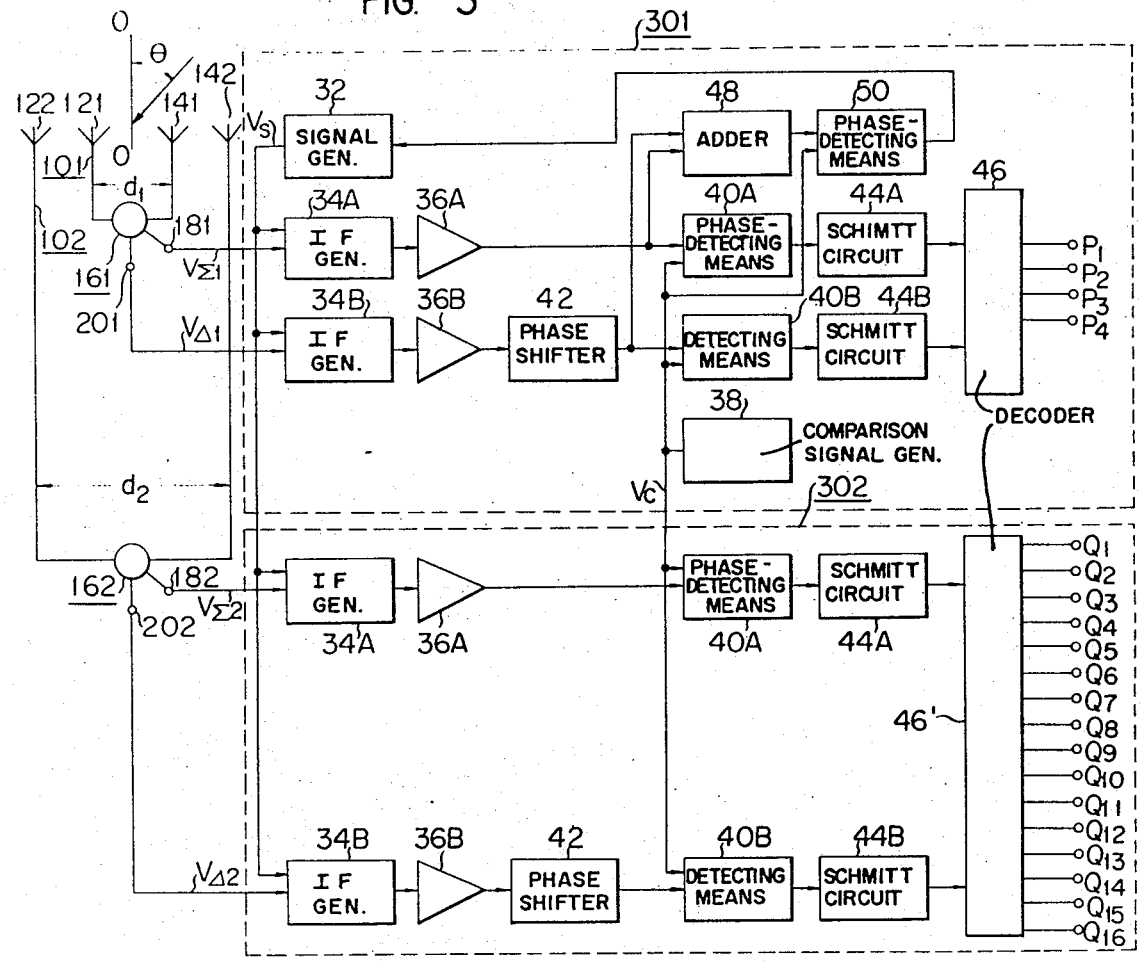
FIG. 3 is a view corresponding to that of FIG. 1, but showing a different modification of the invention.

Referring to FIG. 3, there is shown another embodiment of the invention which allows a higher accuracy of radio incident angle detection. In this arrangement, two antenna arrays 101 and 102 are provided to exist on the same horizontal plane as shown in the FIG. 3. The antenna array 101 comprises a pair of radiator elements 121 and 141 spaced a smaller distance $d_1$ apart and the antenna array 102 comprises a pair of radiator elements 122 and 142 spaced a larger distance $d_2$ apart. As observed in FIG. 3, these pairs of radiator elements 121, 141 and 122, 142 are arranged respectively in symmetric relation with respect to a center axis O — O. The radiator elements 121 and 141 are electrically connected to a hybrid circuit 161, and the radiator elements 122 and 142 to a hybrid circuit 162. These hybrid circuits 161 and 162 may be the same as the hybrid circuit 16, therefore, they also comprise a first and a second output terminals 181, 201 and a first and a second output terminals 182, 202, respectively. As in the previous embodiment, the incoming signal wave derived from the source is received in each of pairs of the radiator elements 121 and 141, and 122 and 142 and supplied therefrom to the associated hybrid circuits 161 and 162 as the input signals. Like the aforementioned first output terminal 18, the first output terminals 181 and 182 yield respectively the sum signals $V\Sigma_1$ and $V\Sigma_2$ of the input signals to the associated hybrid circuits 161 and 162, and the second output terminals 201 and 202 yield respectively, like the previously mentioned second output terminal 20, the difference signals $V\Delta_1$ and $V\Delta_2$.

Figure 4:
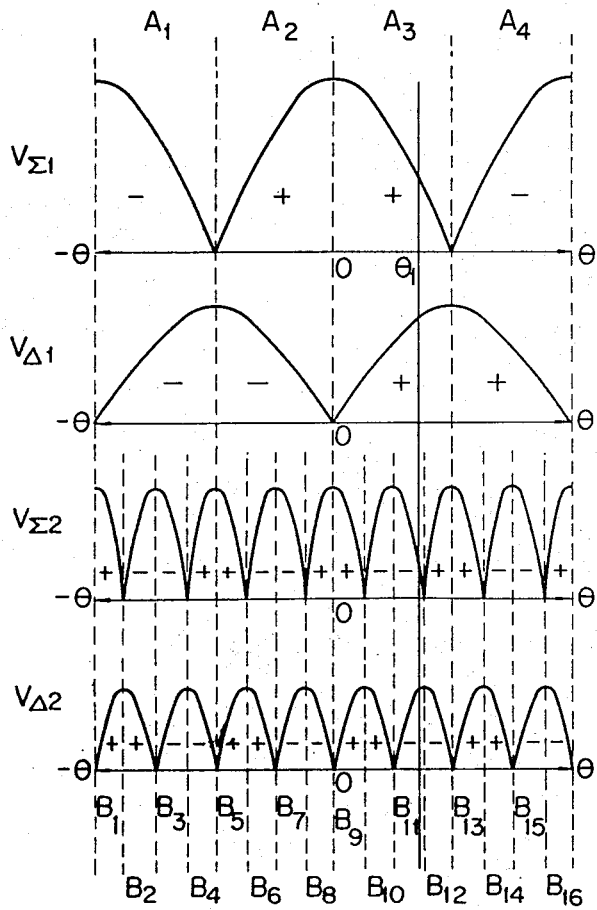
FIG. 4 is a graph of waveforms of the sum and the difference signals including phase characteristics from the hybrid circuits indicated in FIG. 3.

Referring to FIG. 4, there is shown the waveforms for illustrating the amplitude relations and phase relations between the sum signals $V\Sigma_1$, $V\Sigma_2$ and difference signals $V\Delta_1$, $V\ell_2$. As will be observed from FIG. 4, each of the waveforms for the signals $V\Sigma_1$ and $V\Delta_1$ has a longer period of change in phase angle with respect to the incident angle $\theta$ than that of each of the signals $V\Sigma_2$ and $V\Delta_2$. As will be readily understood from the aforementioned equations, this results from the fact that the distance $d_2$ is larger than the distance $d_1$. FIG. 4 illustrates the case of each of the signals $V\Sigma_2$ and $V\Delta_2$ changing for a quarter of the cycle of the signals $V\Sigma_1$ and $V\Delta_1$. Against the signals $V\Sigma_2$ and $V\Delta_2$, the incident angle $\theta$ can be divided into sixteen regions $B_1$ - $B_{16}$, although against the signals $V\Sigma_1$ and $V\Delta_1$ the incident angle $\theta$ can be divided into four regions $A_1$ - $A_4$.

Referring back to FIG. 3, there is shown a pair of radio incident angle detection units 301 and 302 to which the signals $V\Sigma_1$, $V\Delta_1$ and $V\Sigma_2$, $V\Delta_2$ are fed respectively. The detection unit 301 is identical with the previously mentioned detection unit 30, and the detection unit 302 is similar to the detection unit 30 except that the reference signal generator 32, the comparison signal generator 38, the adder 48, and the phase detector 50 are not included and a detector 46' is formed as a two-input sixteen-output decoder having sixteen output terminals $Q_1 - Q_{16}$. As illustrated in FIG. 3, the reference signal $V_s$ from the reference signal generator 32 is supplied to not only the detection unit 301 but also the detection unit 302, and the comparison signal $V_c$ from the comparison signal generator 38 is supplied to the detection unit 301 and also the detection unit 302.

An output from the detector 46' appears at four of the output terminals $B_1 - B_{16}$. It depends on the combinations of polarities of the signals $V\Sigma_2$ and $V\Delta_2$ at the terminals where the output appears, i.e., when the signals $V\Sigma_2$ and $V\Delta_2$ both have positive phases the output appears at the terminals $Q_1, Q_5, Q_9$ and $Q_{13}$; when the signal $V\Sigma_2$ has negative phase and the signal $V\Delta_2$, positive phase, the output appears at the terminals $Q_2, Q_6, Q_{10}$ and $Q_{14}$; when the signals $V\Sigma_2$ and $V\Delta_2$ both have negative phases the output appears at the terminals $Q_3, Q_7, Q_{11}$ and $Q_{15}$; and when the signal $V\Sigma_2$ has positive phase and the signal $V\Delta_2$, negative phase, the output appears at the terminals $Q_4, Q_8, Q_{12}$ and $Q_{16}$.

If it is assumed that the incident angle $\theta$ of the radio wave incident upon the antenna arrays 101 and 102 is $\theta_1$ as shown in FIG. 4, then the detector 46 of the detection unit 301 yields the output at the terminal $P_3$; accordingly it is recognized that the incident angle $\theta$ is within the range $A_3$. On the other hand, the detector 46' of the detection unit 302 yields the output at the output terminals $Q_3, Q_7, Q_{11}$ and $Q_{15}$ as the signals $V\Sigma_2$ and $V\Delta_2$ which both have the negative phases. This means that the incident angle $\theta$ is in one of the regions $B_3, B_7, B_{11}$ and $B_{15}$. Therefore, it can be recognized that by combining the outputs from the detectors 46 and 46' the incident angle $\theta$ is in the range $A_3$, and moreover in the range $B_{11}$.

It will be readily understood that such a radio incident angle detection can be effected by employing three or more antenna arrays in the same manner as described above.

Figure 5:
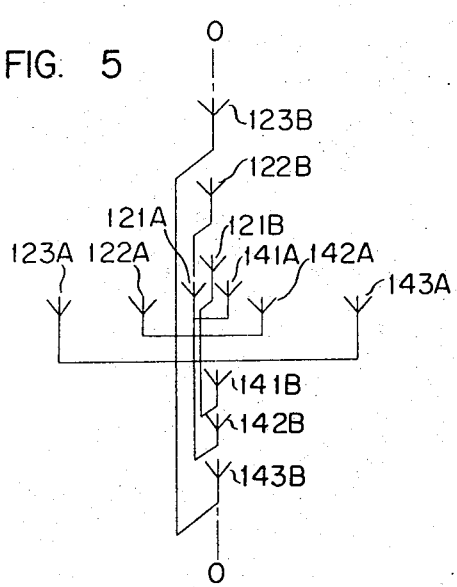
FIG. 5 shows a still different modification of the invention, particularly the arrangement of radiator elements of the apparatus.
Figure 6:
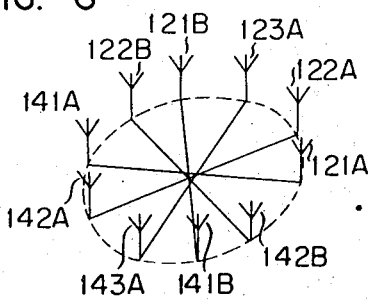
FIG. 6 is a view corresponding to that of FIG. 5, but showing still another modification of an arrangement of the antenna element.

FIGS. 5 and 6 show the antenna arrangements each of which is capable of finding a three-dimension incident angle of the radio wave. In the arrangement shown in FIG. 5, three antenna arrays are provided including, respectively, the paired radiator elements 121A, 141A and 122A, 142A and 123A, 143A in the first plane including the center axis O — O and another three antenna arrays including, respectively, the paired radiator elements 121B, 141B and 122B, 142B and 123B, 143B in the second plane perpendicular to the first plane and also including the center axis O — O. The pair of radiator elements of each antenna array is arranged in symmetric relation to the axis O — O and these pairs of radiator elements are spaced different distances apart from one another. In the arrangement shown in FIG. 6, ten radiator elements among the twelve shown in FIG. 5 are distributed in circular configuration. Of course, each of six antenna arrays shown in FIG. 5 and five antenna arrays shown in FIG. 6 can be associated, respectively, with a hybrid circuit and a detection unit similar to the hybrid circuit 16 and the detection unit 30 as illustrated in FIG. 1. Therefore, the incident angle of three dimensions can be detected by combining the various outputs from the detection units associated with the respective antenna arrays.

What we claim is:

1. An apparatus for detecting an incident angle of a radio wave comprising, an antenna array including at least a pair of radiator elements by each of which said radio wave is received, means for generating a sum signal and a difference signal from said radio wave, each of said sum and difference signals having a positive or negative phase depending on a magnitude of said incident angle, a detection unit receiving said sum and difference signals and determining the magnitude of said incident angle in accordance with phase relations between said sum and difference signals, said detection unit comprising a first phase-detecting means for detecting a first signal based on said sum signal by a comparison signal, a second phase-detecting means for detecting a second signal based on said difference signal by said comparison signal, and a detector for determining a magnitude of said incident angle in accordance with a combination of outputs from said first and second phase-detecting means.

2. The apparatus as claimed in claim 1, said detection unit further comprising a first intermediate frequency generator receiving said sum signal and a reference signal and generating a first intermediate frequency output on basis of which said first signal is produced, and a second intermediate frequency generator receiving said difference signal and said reference signal and generating a second intermediate frequency output on basis of which said second signal is produced.

3. The apparatus as claimed in claim 2, comprising a phase-shifter for shifting said second intermediate frequency out-put in phase angle by 90° to compensate a 90° phase difference between said sum and difference signals, said shifted output being utilized as said second signal.

4. The apparatus as claimed in claim 2, comprising a third phase-detecting means for detecting an added output of said first and second signals by said comparison signal, said third phase-detecting means developing such an output so as to allow a frequency of said reference signal to be regulated to lock the phases of said first and second signals.

5. The apparatus as claimed in claim 1, comprising a plurality of antenna arrays, each of which includes said paired antenna elements and associates with said separate hybrid circuit and said separate detection unit, outputs from said detection units being combined to thereby find the incident angle of the radio wave.

6. The apparatus as claimed in claim 5, said plural pairs of antenna elements disposed on a common plane spaced away from one another by different intervals in symmetric relation to a common axis.

7. The apparatus as claimed in claim 5, a predetermined number of said plurality of antenna arrays disposed on a first common plane and the remainder on a second plane different from said first plane.

8. The apparatus as claimed in claim 5, said plurality of antenna elements being disposed on a common periphery.

* * * * *